US010290237B2

(12) United States Patent
Halbrook, Jr. et al.

(10) Patent No.: US 10,290,237 B2
(45) **Date of Patent: *May 14, 2019**

(54) AUTOREJECTING SPLICED DOCUMENT PRODUCT

(71) Applicant: Iconex LLC, Duluth, GA (US)

(72) Inventors: Wendell B Halbrook, Jr., Waynesville, OH (US); Mark A. Anderson, Fairfield, CA (US)

(73) Assignee: Iconex LLC, Duluth, GA (US)

( * ) Notice: Subject to any disclaimer, the term of this patent is extended or adjusted under 35 U.S.C. 154(b) by 48 days.

This patent is subject to a terminal disclaimer.

(21) Appl. No.: 15/289,572

(22) Filed: Oct. 10, 2016

(65) Prior Publication Data

US 2017/0046986 A1 Feb. 16, 2017

Related U.S. Application Data

(63) Continuation of application No. 11/356,357, filed on Feb. 16, 2006, now Pat. No. 9,466,229.

(51) Int. Cl.

| | |
|---|---|
| ***B32B 9/00*** | (2006.01) |
| ***G09F 3/00*** | (2006.01) |
| ***B65H 18/28*** | (2006.01) |
| *G09F 3/02* | (2006.01) |

(52) U.S. Cl.

CPC ........... *G09F 3/0288* (2013.01); *B65H 18/28* (2013.01); *B65H 2301/460183* (2013.01); *G09F 2003/0229* (2013.01); *Y10T 156/1079* (2015.01); *Y10T 428/28* (2015.01)

(58) Field of Classification Search

CPC .................. G09F 3/0288; B65H 18/28; B65H 2301/460183

See application file for complete search history.

(56) References Cited

U.S. PATENT DOCUMENTS

| | | | |
|---|---|---|---|
| 4,901,577 | A | 2/1990 | Roberts |
| 6,112,658 | A | 9/2000 | Gunther et al. |
| 9,466,229 | B2 | 10/2016 | Halbrook, Jr. et al. |
| 2008/0169057 | A1 | 7/2008 | Halbrook et al. |

OTHER PUBLICATIONS

"U.S. Appl. No. 11/356,357, Advisory Action dated May 15, 2009", 3 pgs.
"U.S. Appl. No. 11/356,357, Appeal Brief filed Apr. 7, 2014", 13 pgs.
"U.S. Appl. No. 11/356,357, Appeal Decision dated Feb. 4, 2014", 2 pgs.
"U.S. Appl. No. 11/356,357, Appeal Decision dated Mar. 17, 2016", 8 pgs.
"U.S. Appl. No. 11/356,357, Appeal Decision dated Sep. 13, 2013", 2 pgs.
"U.S. Appl. No. 11/356,357, Examiner's Answer dated Jun. 2, 2014", 13 pgs.
"U.S. Appl. No. 11/356,357, Final Office Action dated Feb. 1, 2010", 7 pgs.

(Continued)

*Primary Examiner* — Victor S Chang

(74) *Attorney, Agent, or Firm* — Schwegman Lundberg & Woessner, P.A.

(57) ABSTRACT

A document product includes a web having a transverse splice therein. A mask is formed near the splice and is subsequently used for automatically rejecting a spliced document.

20 Claims, 4 Drawing Sheets

(56) References Cited

OTHER PUBLICATIONS

"U.S. Appl. No. 11/356,357, Final Office Action dated Feb. 11, 2009", 7 pgs.
"U.S. Appl. No. 11/356,357, Final Office Action dated Apr. 2, 2012", 6 pgs.
"U.S. Appl. No. 11/356,357, Final Office Action dated Apr. 16, 2013", 6 pgs.
"U.S. Appl. No. 11/356,357, Final Office Action dated Oct. 7, 2013", 8 pgs.
"U.S. Appl. No. 11/356,357, Non Final Office Action dated Apr. 11, 2008", 14 pgs.
"U.S. Appl. No. 11/356,357, Non Final Office Action dated Jun. 23, 2009", 7 pgs.
"U.S. Appl. No. 11/356,357, Non Final Office Action dated Jul. 26, 2012", 5 pgs.
"U.S. Appl. No. 11/356,357, Non Final Office Action dated Aug. 10, 2010", 7 pgs.
"U.S. Appl. No. 11/356,357, Non Final Office Action dated Dec. 6, 2012", 8 pgs.
"U.S. Appl. No. 11/356,357, Notice of Allowance dated Jun. 8, 2016", 5 pgs.
"U.S. Appl. No. 11/356,357, Pre-Appeal Brief filed Jan. 7, 2014", 5 pgs.
"U.S. Appl. No. 11/356,357, Pre-Appeal Brief filed Aug. 16, 2013", 5 pgs.
"U.S. Appl. No. 11/356,357, Reply Brief filed Aug. 4, 2014", 3 pgs.
"U.S. Appl. No. 11/356,357, Response filed Jan. 14, 2008 to Restriction Requirement dated Nov. 21, 2007", 13 pgs.
"U.S. Appl. No. 11/356,357, Response filed Mar. 25, 2013 to Non Final Office Action dated Dec. 6, 2012", 11 pgs.
"U.S. Appl. No. 11/356,357, Response filed May 11, 2009 to Final Office Action dated Feb. 11, 2009", 9 pgs.
"U.S. Appl. No. 11/356,357, Response filed Jun. 30, 2011 to Non Final Office Action dated Aug. 10, 2010", 10 pgs.
"U.S. Appl. No. 11/356,357, Response filed Jul. 2, 2012 to Final Office Action dated Apr. 2, 2012", 12 pgs.
"U.S. Appl. No. 11/356,357, Response filed Aug. 2, 2010 to Final Office Action dated Feb. 1, 2010", 11 pgs.
"U.S. Appl. No. 11/356,357, Response filed Sep. 4, 2008 to Non Final Office Action dated Apr. 11, 2008", 13 pgs.
"U.S. Appl. No. 11/356,357, Response filed Oct. 23, 2009 to Non Final Office Action dated Jun. 23, 2009", 9 pgs.
"U.S. Appl. No. 11/356,357, Response filed Oct. 26, 2012 to Non Final Office Action dated Jul. 26, 2012", 11 pgs.
"U.S. Appl. No. 11/356,357, Response filed Dec. 10, 2008 to Restriction Requirement dated Nov. 14, 2008", 10 pgs.
"U.S. Appl. No. 11/356,357, Restriction Requirement dated Nov. 14, 2008", 6 pgs.
"U.S. Appl. No. 11/356,357, Restriction Requirement dated Nov. 21, 2007", 8 Pgs.
"APS Series™", Pitney Bowes, [Online]. Retrieved from the Internet: <pb.com>, (Oct. 14, 2005), 1 pg.
"LaserMax CD", Laser.max Roll Systems, [Online]. Retrieved from the Internet: <lasermax.com>, (Jan. 2005), 2 pgs.
"LaserMax LX500", Laser.max Roll Systems, [Online]. Retrieved from the Internet: <lasermax.com>, (Jan. 2005), 2 pgs.
"Printers, Continuous Form Printers", IBM, [Online]. Retrieved from the Internet: <printers.ibm.com>, (Oct. 14, 2005), 1 pg.
"Turbo™ 22", Bowe Bell + Howell, [Online]. Retrieved from the Internet: <bellhowell.com>, (Oct. 14, 2005), 2 pgs.

AUTOREJECTING SPLICED DOCUMENT PRODUCT

RELATED APPLICATIONS

This Application is a continuation of U.S. patent application Ser. No. 11/356,357, filed Feb. 16, 2006, entitled: "Autorejecting spliced document product" now issued as U.S. Pat. No. 9,466,229; the disclosure of which is incorporated by reference herein in its entirety.

BACKGROUND OF THE INVENTION

The present invention relates generally to stationery products, and, more specifically, to high speed and volume mailing systems.

Many companies have thousands of customers to which they periodically mail various documents during the normal course of business. The documents may include typical bills, checks, forms, and direct response applications. Periodic mailings typically occur on a monthly basis for many commercial applications.

Accordingly, these companies typically utilize conventional high volume and high speed equipment for printing the documents, compiling the documents in corresponding envelopes, and mailing the envelopes en masse.

The processing equipment used by these companies is specially configured for sustained, continuous, high speed operation including the printing and compiling of envelopes in thousands of units per hour. The systems are computer controlled and include sophisticated drive systems for sustaining the high speed throughput of the documents through the many stages of operation, from the initially provided printing medium or paper to the finally assembled envelopes.

Once the system is set into operation, it may operate continuously for many hours without operator intervention, unless problems are developed. Any problem which interrupts the high speed operation of the system has an associated cost in lost productivity as well as increased expense.

Accordingly, these companies require reliable processing equipment, and a high quality initial stationery product which can withstand the high speed processing thereof through the equipment. The typical stationery product for this equipment is a large diameter roll of printing media such as typical paper. The paper roll is initially provided from a paper mill company in a long web having plain or blank opposite sides.

The plain mill roll is then processed by an intermediate company that typically preprints on one or both sides of the web fixed or background printing for a particular high volume commercial customer, such as retail companies, utility companies, and credit card companies.

The roll is preprinted to define the specific configuration of the final document to be used by the associated customer. The individual document may have one or more pages with background print which will later be over-printed by the final customer with the requisite variable print thereon, such as typical billing statements or payment checks.

The documents are arranged in a repeating series along the running length of the product roll, and may also repeat across the transverse width of the web.

The web typically also includes various lines of perforations typically bridging the width of the web so that the individual documents may later be cleanly torn along the perforations as required for the specific document configuration and intended use.

The mill roll is typically printed in a high speed lithographic printer capable of printing thousands of page impressions per hour as the paper web is unwound from the mill roll and rewound into the product roll in preferably continuous high speed operation.

However, problems may develop in printing the mill roll which can interrupt the continuous printing thereof. In this case, hundreds of feet of the web may be improperly printed, or printed with defects rendering this section of the product roll unusable by the intended customer.

Another potential problem with the mill roll is the inclusion therein of a typical mill splice at which corresponding ends of the web are overlapped and adhesively bonded together to form the required diameter of the mill roll and associated requisite length of the web.

Mill splices are typically undesirable since they can adversely affect performance of the high speed processing equipment, and will present a significant defect in any document finally containing the mill splice.

Accordingly, the intermediate company will doctor the preprinted product to remove undesirable defects therein. For example, the long sections of improperly printed web will be removed from the web and discarded as print waste. And, any mill splice found in the roll will also be removed and discarded.

The sections of the web are typically removed in a manual operation by a technician and the corresponding severed ends of the web are manually spliced together in splice known as a press splice. The press splice may be a simple overlap of the web ends suitably adhesively bonded together. Or, the press splice may use a narrow strip of adhesive tape to join together the web ends at a transverse butt joint extending across the full width of the web.

The press splice is specifically configured for maintaining strength of the product roll when subsequently used in high speed laser printers by the intended customer. In a laser printer, a hot fusion roller is provided, and the press splice must be sufficiently strong to withstand the heat of the fusion roller without failure.

Furthermore, during the doctoring process the specific form of documents has already been preprinted on the web, and the press splice is then specifically introduced into the web at a convenient location either at the junction between two documents, or along a line of perforations therein to minimize the adverse aesthetic appearance thereof.

However, some intended customers may still find the press splice undesirable or unacceptable. Very few of such press splices are found in an individual product roll, yet even one press splice may be unacceptable to the customer since that splice will eventually be found in the final document mailed to the intended recipient or retail customer.

Accordingly, during the doctoring process a small flag can be introduced at the site of the press splice so that it is readily visible externally on the exposed side of the roll by the customer's technician. The technician, in turn will mount the infeed product roll into the high speed processing equipment therefor, and that equipment will be operated normally at high speed until the product roll is sufficiently unwound to the region of the flagged splice. The equipment will then be operated at relatively low speed to isolate the flagged splice and then ensure that the document containing the press splice is not printed or further used. Upon passing the flagged splice, the high speed printer then returns to high speed operation.

This typical manner of avoiding the use of the flagged splice document interrupts the high speed processing of the entire roll and is a significant problem when there may be only one or two press splices found in the entire product roll, which represents only one or two unacceptable documents in the multiple thousands of documents produced from the single product roll.

Interrupting the high speed printing of the product roll correspondingly reduces throughput of the printer, requires additional time to complete the full batch from the product roll, and has an associated extra cost in processing.

Although the preprinted web is typically rewound into the press or product roll, it may alternatively be provided in a large fanfold product for subsequent use by the customer. In either roll or fanfold form the preprinted product may still include the undesirable press splice.

Accordingly, it is desired to provide an improved document product for eliminating the need to interrupt high speed processing thereof when a press splice is found therein.

BRIEF SUMMARY OF THE INVENTION

A document product includes a web having a transverse splice therein. A mask is formed near the splice and is subsequently used for automatically rejecting a spliced document.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
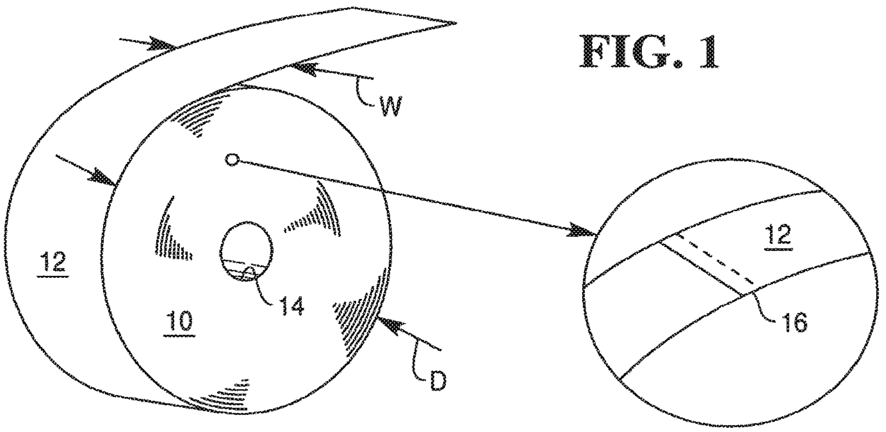
FIG. 1 is a isometric view of a mill roll including a mill splice therein.

Illustrated in FIG. 1 is a mill roll 10 having a continuous narrow web 12 wound in a spiral around a hollow supporting core 14. The web may be formed of any suitable stationery material, such as typical paper, and has a transverse width W.

The web is wound or laminated around the core 14 in a multitude of layers to achieve the desired final outer diameter D, which is about fifty (50) inches in one embodiment. The roll or web width W may be about 15 to 20 inches for example. The web has a typical thickness of a few mils, and when wound to the large diameter intended will have thousands of overlapping layers in the roll.

The mill roll 10 is provided from the paper mill company with plain or blank opposite sides of the web for subsequent printing thereon by the intended commercial customer. The mill roll 10 may have one or more mill splices 16 therein as required by the mill to provide the continuous web of the required length and rolled diameter D. The mill splice is typically formed by overlapping two cut ends of the web and using a suitable adhesive for fixedly bonding together the two ends at the splice.

The mill roll is provided to an intermediate company for suitable processing thereof before sale to the intended commercial customer for the specific use thereof. The intermediate company typically preprints the mill roll 10 in a suitable high speed printing press or printer 18, such as a lithographic printer schematically illustrated in FIG. 2. The printer 18 is capable of printing thousands of page impressions per hour at a web speed as high as about 300-1500 feet per minute.

In addition to printing the web 12, a conventional perforation (perf) cutting station or machine 20 is typically also used for cutting perforation lines in the web as required for the specific configuration of the intended customer.

The high speed printer 18 and perf cutter 20 cooperate with a conventional high speed unwind machine 22 in which the mill roll 10 is mounted on a center shaft for unwinding the web from the roll as the web is driven through the printing press 18. A conventional high speed rewind machine 24 is provided at the discharge end of the printer and contains a powered take up spool or core 14 upon which the web 12 is rewound after being printed and cut with perforations.

The mill roll 10 is depleted as it is unwound in the unwinder 22, and rewound in the rewinder 24 to form the subsequent laminar press roll product 10*a*. The press roll 10*a* is identical to the original mill roll 10 in diameter D and width W in which the web 12 has now been printed on either or both sides thereof as desired, and suitably formed with perforation lines as desired.

In an alternate configuration, the preprinted web 12 may be conventionally stacked or laminated into a fanfold press product 10*b* having a multitude of identical sheets or laminations. The web remains continuous in length and is typically folded at corresponding lines of perforation to form the tall stack of laminae.

In both roll and fanfold configurations, the laminar press product 10*a,b* includes a multitude of unbonded, stacked sheet layers with few, if any, mill splices 16 therein.

Figure 3:
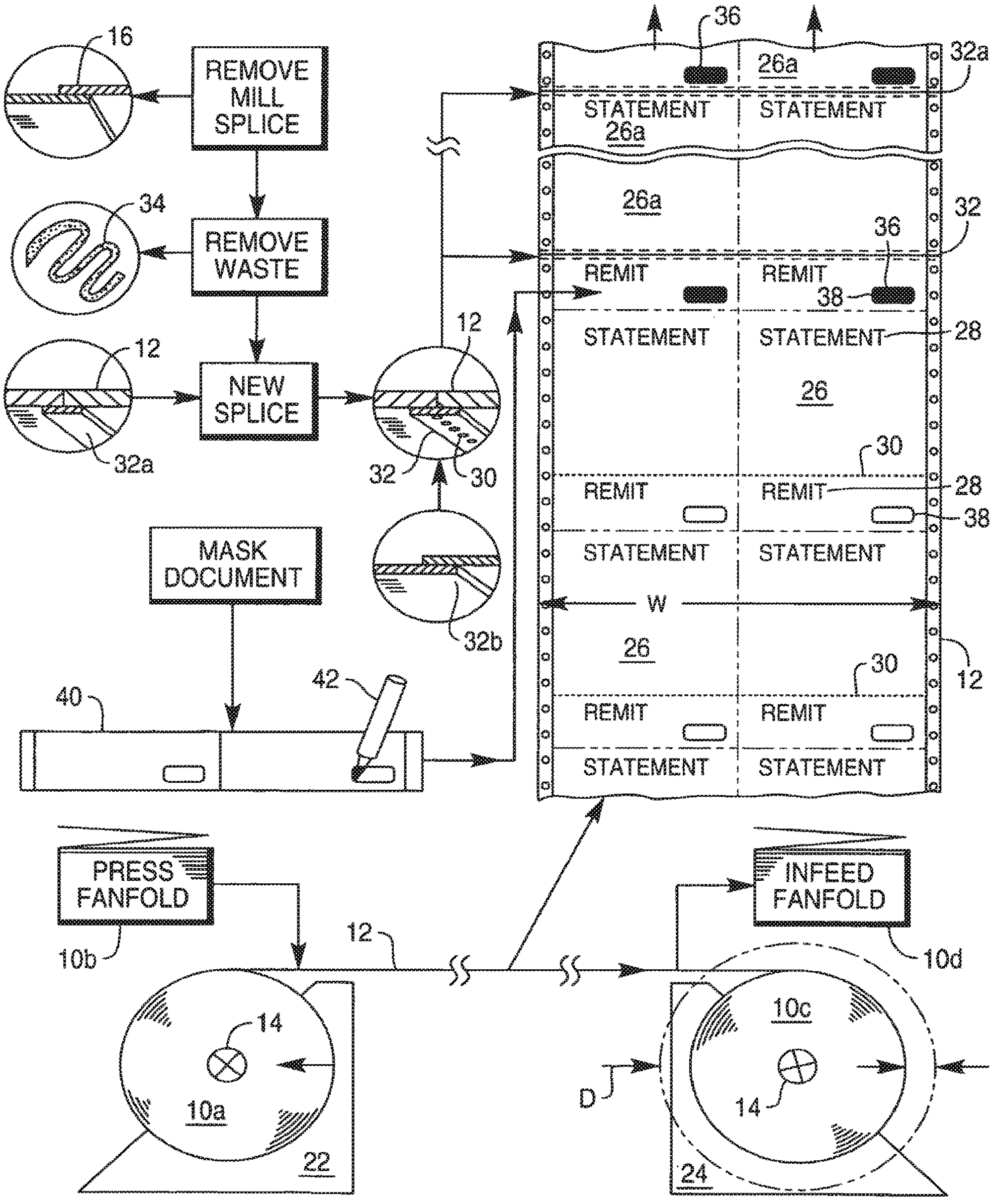
FIG. 3 is a schematic representation for doctoring the press product illustrated in FIG. 2 to introduce a press splice therein.

FIG. 3 illustrates schematically the printed press roll 10*a* mounted in the unwinder 22 for suitable doctoring and rewinding on another core 14 in the rewinder 24.

Figure 2:
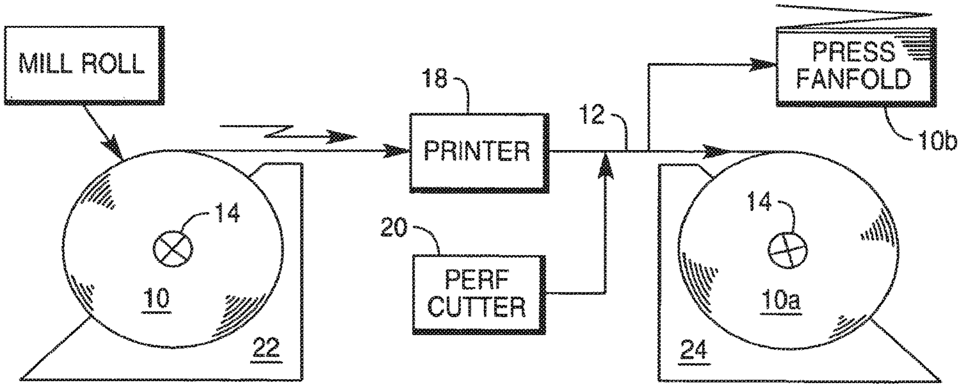
FIG. 2 is a schematic representation of high speed printing and perforation of the mill roll to form a press product.

The entire web 12 illustrated in FIG. 3 has been suitably preprinted by the printer 18 in FIG. 2 to define or include a multitude of individual documents 26 repeating identically along the longitudinal or running axis of the web 12. The documents 26 may have any suitable form as required by the intended commercial customer, such as billing statements, payments checks, direct response applications, or various types of commercial forms.

The individual documents 26 may be defined by the repetition thereof, with each document being identical to preceding and subsequent documents in turn, as identified by the fixed or background preprinting 28 thereon. The preprint 28 may be on either or both sides of the web as desired and typically includes fixed information common to the multitude of documents for the intended application, such as the exemplary billing statement and portion to remit return payment therefor.

The individual documents illustrated in FIG. 3 may also be defined by repeating lines of perforations 30 formed by the perf cutter shown in FIG. 2, which lines repeat along the running axis of the web in the repeating documents 26 which are yet again identical in configuration, including both preprinting thereon and the perforation lines.

Accordingly, the original plain mill roll 10 illustrated in FIG. 2 is initially unwound, printed in the high speed printer 18 to define the individual documents 26 therein, and then rewound or relaminated to form the resultant press roll product 10*a*. The press roll 10*a* shown in FIG. 3 is itself then dispensed or unwound, suitably doctored by the intermediate company, and rewound or relaminated to form the desired doctored roll product 10*c* which defines the infeed roll delivered to the subsequent commercial customer for further processing thereof as required.

In the alternate configuration also shown in FIG. 3, the fanfold press product 10*b* may be suitably dispensed or unstacked, doctored in the same manner, and restacked or relaminated into the correspondingly doctored fanfold product 10*d* which defines an infeed fanfold delivered to the commercial customer.

In both roll and fanfold configurations, the laminar infeed product 10*c,d* includes a multitude of unbonded, stacked sheet layers with few, if any, mill splices 16 therein.

FIG. 3 illustrates schematically the doctoring or intermediate processing of the similar preprinted web 12 in the press roll 10*a* or press fanfold 10*b* which introduces therein a transverse press splice 32 that extends across the full width of the web 12 either perpendicularly thereacross, or at a suitable inclination if desired.

In one embodiment, the web 12 is severed or cut at the preexisting mill splice 16 for removing and discarding the mill splice, and then the severed web is respliced by introducing the press splice 32. The press splice 32 may have any suitable configuration and strength for subsequent operation in high speed laser printers without failure which would interrupt the continuous operation thereof.

The printed web 12 may also be doctored to remove any printed waste 34 introduced therein during the high speed preprinting illustrated in FIG. 2. For example, the deposited print may be incomplete due to printing errors, and the resulting defective documents must be removed from the product roll before shipment to the customer.

Accordingly, the printed waste 34 section of the web may amount to tens or hundreds of feet due to the high speed feeding of the web through the high speed printer, and therefore that long section of web is suitably severed and removed from the remaining web. The cut ends of the remaining web are then spliced together with the press splice 32.

It is possible that the original press products 10*a,b* may be devoid of both mill splices 16 or printed waste 34, in which case no press splices 32 will be required therein. However, at least one press splice 32 may be used for replacing any mill splice 16 found in the web, and another press splice 32 may be used at the junction in the web following removal of the printed waste 34. Nevertheless, press splices in the web 12 are relatively few and typically amount to no more than one or two in general.

The doctored web 12 may then be conventionally rewound or relaminated in the rewinder 24 for producing the final infeed roll product 10*c* which may contain one or more press splices 32 therein. Or, the doctored web 12 may be suitably restacked or relaminated into the corresponding final infeed fanfold product 10*d*. However, some customers may prefer that not even a single one of the final documents they produce will include the press splice.

In the conventional procedure described above in the Background section, the spliced document may be eliminated with the attendant decrease in processing time as described above. However, interrupting continuous processing of the product roll may be eliminated by introducing therein a relatively simple mask 36 as shown in FIG. 3.

The web 12 illustrated in FIG. 3 may include one or more of the transverse press splices 32, and a corresponding mask 36 adjacent thereto. The mask 36 is provided in the web only at the location of the press splice 32, if any, and the remainder of the entire web is therefore devoid of the mark 36 except at that splice.

Since the web 12 illustrated in FIG. 3 is configured with repeating documents 26 along the running axis thereof, at least one and perhaps two contiguous documents will include one of the press splices 32 thereat.

For example, FIG. 3 illustrates a press splice 32 that bridges the full width W of the web 12 inside the borders of a single spliced document, designated 26*a*. FIG. 3 illustrates another embodiment in which the press splice 32 bridges the width of the web at the junction between two spliced documents 26*a*.

To create the press splice, the web is severed or cut across its entire width, which cut may be within the length of an individual document, or may be at the junction between two end-to-end documents along the running axis of the web. In the one example, the press splice 32 is found inside a document, and in the other example the splice is found at the border or junction of two documents.

Accordingly, the mask 36 is provided on any spliced document 26*a*, with the splice being either inside that document or at the boundary of two contiguous spliced documents. And, the mask 36 is located at a predetermined site in the one or two documents affected.

As indicated above, the documents 26 are specifically configured for the specific application of the intended customer. Common, however, to the high speed processing of repeating documents 26 is the reservation therein of a blank optical recognition signature site 38 which is initially devoid of any marking or print thereat.

Accordingly, this blank site 38 may be used to advantage for automatically rejecting spliced documents 26*a* by introducing the mask 36 to cover the signature site 38 of the spliced document 26*a*, while the signature sites 38 of the pristine or non-spliced documents 26 remain blank in the product roll 10*c*. The predetermined signature site 38 and corresponding mask 36 are therefore disposed inboard of the opposite side edges of the web, and thusly hidden from view inside the doctored roll.

As shown in FIG. 3, the press splice 32 is registered with the spliced document 26*a* at a predetermined location on the web 12. In turn, the mask 36 is registered with the press splice 32 at a predetermined location on the web 12. In, this way, the mask 36 will block out the predetermined signature site 38 in any document containing the undesirable press splice 32 therein.

As indicated above, doctoring of the web 12 shown in FIG. 3 is a conventional process typically accomplished manually by an operator to remove the printed waste 34, or remove the mill splice 16, or both, and resplice the severed web with the new splice. This conventional doctoring process may be modified to simply introduce the corresponding mask 36 at the signature site 38 associated with the spliced document 26*a*.

For example, the mask 36 may be simply placed or formed on the web 12 by overlaying or registering a discrete alignment template 40 over the spliced document, and then using a suitable marking pen 42 to cover, print, or otherwise mark the signature site 38 through the template 40. It is noted that inchoate documents 26 illustrated in FIG. 3 are mostly blank except for the preprint 28 thereon, which does not include any printing at the intended signature site 38 which is itself blank.

FIG. 3 illustrates a visible boundary around the several signature sites 38 for clarity of presentation in this detailed description, when in actuality there would most likely not be any visible identifying boundary. However, if the signature site 38 was readily visible to the operator then the use of the template 40 may be eliminated, and the visible site 38 would be directly marked using the marking pen 42.

In typical configurations the signature site 38 will not be discernible by the operator, and the template 40 may be suitably configured to traverse the full width of the web 12, for example, and be aligned over the individual documents 26 using any available alignment features such as the various perforation lines 30 for example.

In this way, the template 40 may be configured to fully cover the rectangular "remit" portion of the individual document 26, with a small window being provided in the template through which the marking pen 42 will extend to mark the underlying signature site 38 of the document. The template 40 may be specifically configured for the specific form of the intended document 26 and the specific location of the corresponding signature site 38 thereon so that that site may be intentionally blocked out by the operator after forming the press splice 32.

In one embodiment illustrated in FIG. 3, the press splice is in the form of a narrow strip of tape 32 fixedly joining together the web 12 at a coplanar butt joint therein. The splicing tape 32 may be formed of thin polyester of about 2.15 to about 2.45 mils in thickness, and with a width of about 0.31 inches. A suitable acrylic adhesive is used to bond the tape to the web bridging the butt joint. The finished press splice maintains the strength of the web at the joint for withstanding the driving loads associated with high speed processing of the web, and can withstand the elevated temperature of the hot fusion roller in high speed laser printers.

In one embodiment illustrated in FIG. 3, the press splice 32 is located at the site of the perforation line 30 immediately above the "remit" portion of the document, with the perforations being replaced by the severed butt joint. In this embodiment, the splice tape 32 is perforate and itself includes a line of perforations 30 which supplant the original line of perforations lost due to cutting the web at the original line of perforations.

FIG. 3 also illustrates another embodiment of the press splice 32*a* found at the junction between two splice documents 26*a*. In this embodiment, the splice tape 32*a* is identical to the previous splice tape 32, except that it is imperforate and solid.

In alternate embodiments, the press splice may be a simple overlap splice 32*b* having a suitable adhesive bonding together the cut ends of the web. Like the two forms of butt splices 32,32*a* described above, the overlap splice 32*b* may be undesirable to the commercial customer in the printed documents, and may be similarly identified by the corresponding mask 36.

The documents 26 defined on the web 12 repeat at least longitudinally along the running axis thereof where the full width of the web is used for a single document bridging the web. The web may have plain lateral edges, or tractor feed lateral edges with lines of tractor holes as illustrated in FIG. 3 in any conventional configuration.

The documents 26 may also repeat transversely across the width of the web 12, with two documents 26 repeating side by side across the full width of the web in the exemplary embodiment illustrated. Accordingly, the masks 36 preferably repeat transversely across the web 12 in the multiple adjoining spliced documents 26*a* for later use in automatically rejecting each of the so spliced documents.

Figure 4:
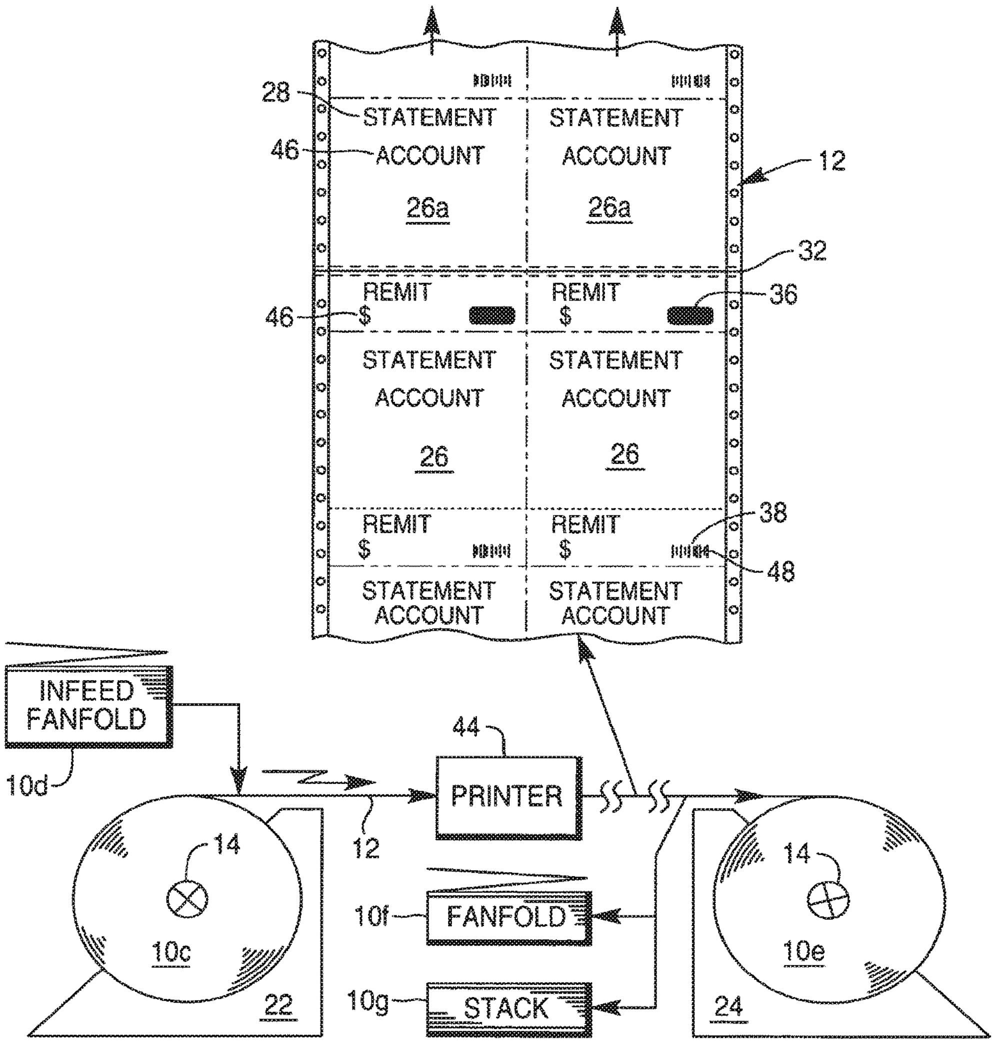
FIG. 4 is a schematic view of a high speed printer for printing variable information on the infeed product illustrated in FIG. 3, which is laminated into a customer product.

The finally doctored web 12 illustrated in FIG. 3 is fully rewound on the center core 14 of the infeed roll 10*c*, or restacked in the infeed fanfold 10*d* for subsequent delivery to the intended customer. FIG. 4 illustrates an exemplary method of using the document product 10*c,d* by the customer following doctoring thereof by the intermediate company.

The intended commercial customer receives the infeed product 10*c,d* with the doctored web 12 thereof including the repeating documents 26 therein, along with one or more of the press splices 32 and the corresponding masks 36. The product roll 10*c* is mounted in the unwinder 22 and fed at high processing speed through a suitable printer 44, such as a high speed laser printer capable of printing thousands of page impressions per hour produce a printed customer roll 10*e*. In this embodiment, both the unwinder 22 and rewinder 24 are suitably powered to unwind and rewind the web in turn.

Alternatively, the doctored web 12 may be suitably dispensed from the infeed fanfold lad, printed in the printer 44, and restacked or relaminated into a customer printed fanfold 10*f*, or cut into sheets and stacked into a customer printed stack 10*g*.

In the high speed printer 44 illustrated in FIG. 4 the web 12 of the infeed product 10*c,d* is post-printed by the customer with variable print 46 to complement the preprinted background print 28 and complete the full printing of the individual documents 26; including the spliced documents 26*a*. The variable print 46 is different for the multitude of documents 26 found on the web 12 to correspond with the different intended recipients thereof.

In the typical situation, a multitude of credit card bills would be sent to a multitude of credit card customers, with the variable print on the credit card bills being different for the different purchases made by those customers.

During the printing process, a different or variable identification signature 48 is printed atop the corresponding, initially blank signature sites 38 in the different documents, including the spliced document 26*a*. However, since the spliced document initially includes the mask 36 on the signature site 38, the overprinting of the mask 36 with the intended signature 48 obscures or obliterates the post-printed signature 48 making it unreadable or illegible.

The signature 48 may have any conventional form for being read by a suitable scanner. For example, the signature may be in the form of a conventional barcode 48, having one or two dimensions in accordance with conventional practice for encoding therein various information associated with the specific document 26. The signature may be in the form of any other optical recognition mark, and the signature is typically visible, although could be invisible depending upon the type of scanner used to decode the signature.

Correspondingly, the mask 36 may be in the simple form of an ink mark left by the marking pen 42 illustrated in FIG. 3 that covers the signature site 38 to obscure or obliterate the barcode signature 48 when printed thereatop.

Figure 5:
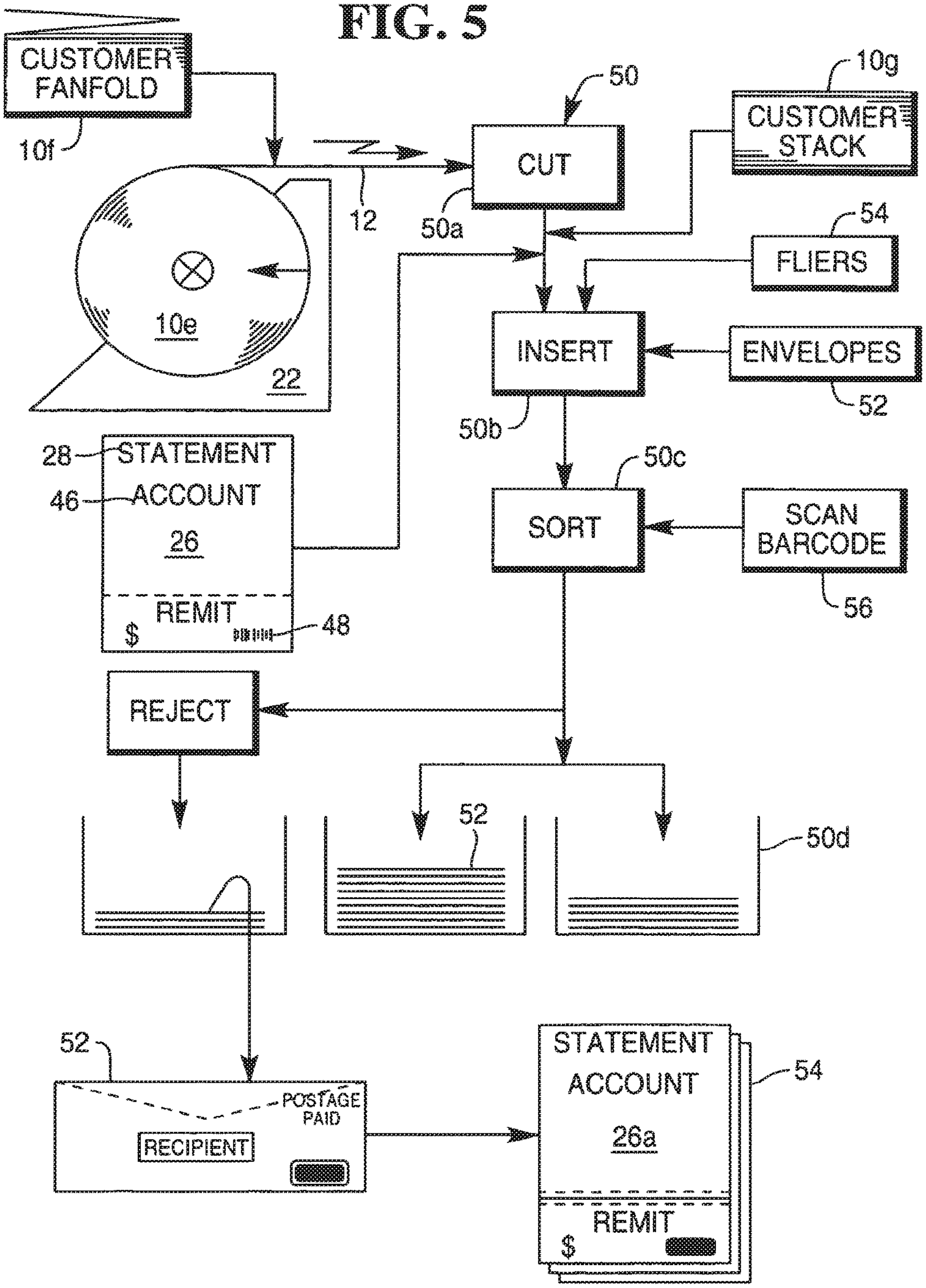
FIG. 5 is a schematic view of the high speed processing of the customer product illustrated in FIG. 4 to divide the printed documents, compile them in corresponding envelopes, and automatically reject the spliced documents.

The customer product 10*e,f,g* printed by the customer in FIG. 4 then undergoes additional high speed processing for subsequent delivery to the multitude of intended recipients. FIG. 5 illustrates mounting of the customer roll 10*e* on the high speed unwinder 22 with the web 12 being fed into a conventional high speed mailing or compiling machine 50. In this machine, the customer roll 10*e*, is unwound, cut to separate the printed documents 26, and scanned to reject the spliced documents 26*a*, if any.

Alternatively, the customer fanfold 10*f* may be suitably driven through the compiling machine 50, cut to separate the printed documents 26, and scanned to automatically reject the spliced documents 26*a*, if any. Or, the pre-cut customer stack 10*g* may be suitably fed into the compiling machine 50, with the pre-separated printed documents 26 being scanned in sequence to automatically reject the spliced documents 26*a*, if any.

The compiling machine 50 may have several units or stages all operating in concert at high speed for inserting thousands of envelopes 52 per hour. One unit includes a cutting machine 50*a* to cut the web 12 transversely between adjacent documents 26, as well as longitudinally between laterally adjacent documents as found in the web.

The cut documents 26 are channeled to a high speed insertion machine 50*b* that compiles one or more pages of flat or folded documents 26 with additional brochures or fliers 54 inside a corresponding envelope 52. The envelopes 52 are then automatically sorted in a sorting unit 50*c* into corresponding bins 50*d* as desired for subsequent mailing to the intended recipients.

The compiling machine 50 includes various sensors therein, such as a conventional optical scanner 56 specifically configured for reading and decoding the corresponding identification signatures 48 at any suitable location along the feedpath. The scanner 56 may be configured for reading visible, invisible, or infrared signatures 48 of any suitable configuration such as the ubiquitous optical mark reader (OMR) marks or UPC barcodes.

The signature 48 encodes various information including the number of pages of each document to be compiled in a given envelope along with the number and configuration of corresponding fliers 54. The documents 26 separated from the original web 12 are than automatically inserted into the corresponding envelopes 52, and any envelope 52 containing a spliced document 26*a* will automatically be rejected by the sorter 50*c* and isolated from those envelopes containing the non-spliced documents 26 therein not having masked signatures 48.

The simple introduction of the mask 36 in the infeed product 10*c,d* disclosed above permits the automatic sorting and rejecting system within the conventional compiling machine 50 to automatically reject and isolate the spliced documents 26*a* within their corresponding envelopes 52 at the full speed of the compiling machine 50 without any need to interrupt that machine, or slow down that machine or otherwise decrease the high speed processing of the web 12 in either the high speed printer 44 illustrated in FIG. 4 or the high speed compiling machine 50 illustrated in FIG. 5.

The compiling machine 50 conventionally includes the sorter 50*c* and the associated scanner 56 for conventionally, rejecting documents for various reasons independent of any splice found in any of the documents. By disabling the signature 48 in the spliced documents 26*a* by preprinting the corresponding mask 36 therein, the spliced documents 26*a* will be automatically rejected. The so rejected spliced documents may then be reprinted in a conventional manner, along with documents rejected for other reasons, in a subsequent batch for completely eliminating spliced documents in envelopes mailed to the retail customers.

Depending upon the specific configuration or application of the document 26, the size, format design, light absorbing material, color, and position of the blocked-out mask 36 may vary. However, the mask is predeterminedly placed in the area of the document where the barcode or other recognition symbol or signature is printed, and is thusly not externally visible in the multitude of web laminae found in the roll or stack. The mask will become exposed only as the web is dispensed through the compiling machine, and will thusly prevent or block the normal read recognition function of the optical scanner and cause the compiling machine to automatically reject, divert, and isolate the illegible masked signature in the corresponding spliced document as instated in the corresponding envelope.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A document product, comprising:
- a web having repeating documents, each document including a preprint thereon;
- an optical recognition signature site on each document; and
- a mask other than the preprint, the mask proximate to a transverse splice of the web and located in the optical recognition signature site of each document.

2. The document product of claim 1, wherein the document product is a laminar document product.

3. The document product of claim 1, wherein the web is laminated in a plurality of layers.

4. The document product of claim 3, wherein the web is devoid of the mask except adjacent to the transverse splice.

5. The document product of claim 3, wherein the mask is other than the preprint.

6. The document product of claim 1, wherein the web includes repeating lines of perforations in the repeating documents.

7. The document product of claim 1, wherein the transverse splice comprises a tape joining together the web at a joint therein.

8. The document product of claim 1, wherein the repeating documents are situated along an axis of the web.

9. The document product of claim 1, wherein optical recognition signature site, on each document, comprises a location for printing a barcode.

10. The document product of claim 9, wherein the mask includes a mark for covering the optical recognition signature site and obscure the barcode.

11. A roll, comprising:
- a multilayered web wound in a spiral having a plurality of repeating documents;
- an optical recognition signature site situated on each document at a predetermined location for each document; and
- a mask proximate to a splice that bridges two spliced documents along an axis of the multilayered web, wherein the mask is present in the optical recognition signature site of a particular document adjacent to the splice.

12. The roll of claim 11, wherein the mask is present within the splice.

13. The roll of claim 11, wherein each of the documents include a blank optical recognition site with the mask covering the blank optical recognition site.

14. The roll of claim 13, wherein the splice bridges a width of the multilayered web.

15. The roll of claim 11, wherein the multilayered web includes repeating lines of perforations in the repeating documents, and the splice is located at the perforations.

16. An infeed product fanfold, comprising:

a multilayered web having repeating documents along an axis of the multilayered web;

a series of optical recognition signature sites at a predetermined location for each of the repeating documents; and a mask proximate to a splice to distinguish a spliced document from a non-spliced document from the multilayered web, and the mask provided in each of the optical recognition signature sites.

17. The infeed product fanfold of claim 16, wherein the splice is located at perforations of the repeating documents.

18. The infeed product fanfold of claim 17, wherein the splice comprises a tape joining together the web at a butt joint therein.

19. The infeed product fanfold of claim 18, wherein the tape is perforate.

20. The infeed product fanfold of claim 16, wherein the mask is included in the splice.

* * * * *